(12) United States Patent
Brandl et al.

(10) Patent No.: US 8,469,828 B2
(45) Date of Patent: Jun. 25, 2013

(54) ELASTIC JOINT BODY

(75) Inventors: Marc Brandl, Burgkirchen (DE);
Thomas Gruenwald, Muehldorf (DE);
Wolfgang Nindel, Muehldorf (DE);
Thomas Ochsenkuhn, Rechtmehring (DE)

(73) Assignee: SGF Suddeutsche Gelenkscheibenfabrik GmbH & Co. KG, Waldkraiberg (DE)

( * ) Notice: Subject to any disclaimer, the term of this patent is extended or adjusted under 35 U.S.C. 154(b) by 39 days.

(21) Appl. No.: 12/996,204

(22) PCT Filed: May 28, 2009

(86) PCT No.: PCT/EP2009/003832
§ 371 (c)(1),
(2), (4) Date: Feb. 17, 2011

(87) PCT Pub. No.: WO2009/146844
PCT Pub. Date: Dec. 10, 2009

(65) Prior Publication Data
US 2011/0190067 A1    Aug. 4, 2011

(30) Foreign Application Priority Data
Jun. 5, 2008   (DE) .......................... 10 2008 026 763

(51) Int. Cl.
*F16D 3/78*    (2006.01)
(52) U.S. Cl.
USPC .......................................................... 464/69
(58) Field of Classification Search
USPC ............................................... 464/69, 93–96
See application file for complete search history.

(56) References Cited

U.S. PATENT DOCUMENTS

| | | | | |
|---|---|---|---|---|
| 1,753,985 A | * | 4/1930 | Flintermann | ............... 464/94 X |
| 4,118,952 A | | 10/1978 | Kobayashi | |
| 4,790,794 A | * | 12/1988 | Takeda et al. | ................... 464/93 |

FOREIGN PATENT DOCUMENTS

| | | |
|---|---|---|
| DE | 3734089 A1 | 6/1988 |
| DE | 3942432 C1 | 5/1991 |
| EP | 1302686 A2 | 4/2003 |
| FR | 837 975 | 2/1939 |
| GB | 497903 * | 12/1938 ..................... 464/94 |
| JP | 55001067 A | 1/1980 |
| JP | 11325101 A | 11/1999 |

OTHER PUBLICATIONS

International Search Report for International Appln. No. PCT/EP2009/003832 mailed Aug. 19, 2009.

* cited by examiner

*Primary Examiner* — Gregory Binda
(74) *Attorney, Agent, or Firm* — Carter, DeLuca, Farrell & Schmidt LLP

(57) ABSTRACT

An elastic joint body for a shaft arrangement for the articulated connection of two shaft sections is provided, with a plurality of bushings arranged in the circumferential direction at predetermined angular distances with respect to a center axis of the joint body, a plurality of loop bundles, each loop bundle looping around in each case two adjacent bushings, and a rubber-elastic casing in which the loop bundles and the bushings are at least partially embedded. A flange is provided at least one end region on at least one of the bushings for the axial support of an adjacent loop bundle, encircling the bushing, being at least partially embedded in the rubber-elastic casing and having a U-shaped cross-section, as viewed in the axis-containing section, the cross-section being designed with two U longitudinal limbs and one U transverse limb, the flange bearing with a U longitudinal limb against the bushing.

16 Claims, 7 Drawing Sheets

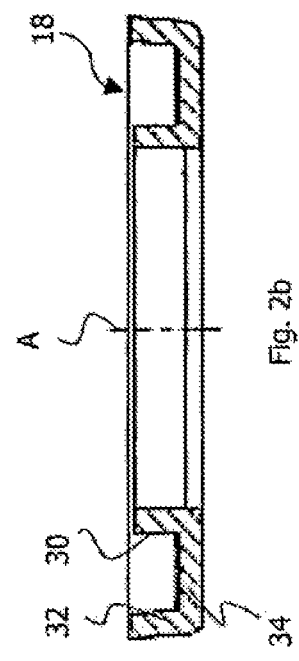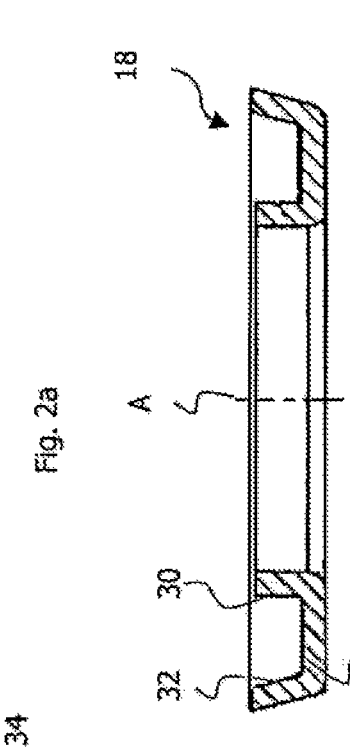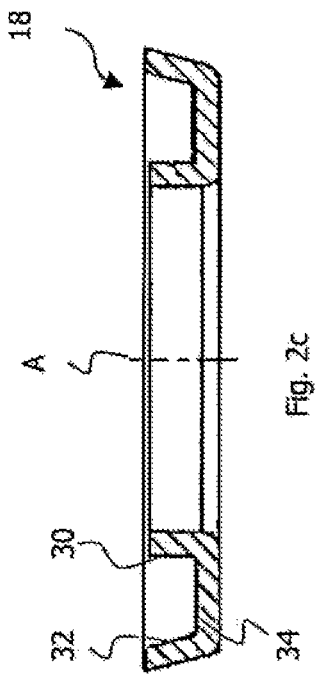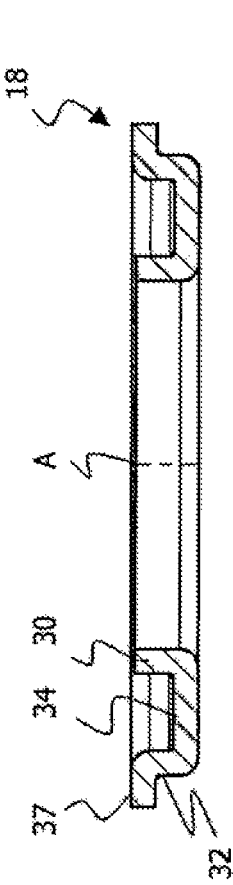

ELASTIC JOINT BODY

TECHNICAL FIELD

The present invention relates to an elastic joint body for a shaft arrangement for the articulated connection of two shaft sections, with a plurality of bushings which are arranged in the circumferential direction at predetermined angular distances with respect to a centre axis of the joint body, a plurality of loop bundles, each loop bundle looping around in each case two adjacent bushings, and a rubber-elastic casing in which the loop bundles and the bushings are at least partially embedded.

BACKGROUND

Joint bodies of this type are known from the prior art and disclosed, for example, in German Laid-Open Application DE 37 34 089 A1. This document describes in the introductory part of the description an elastic joint body, in which collars are pressed on in the axial direction for the axial support of the loop bundles. The collars have an L-shaped profile and by pressing them onto in each case one bushing end are connected to the bushing in an axially non-displaceable and rotationally fixed manner. Between the individual loop bundles which loop around the bushings, supporting elements are arranged for the axial guidance of the loop bundles around the bushings. Both the L-shaped collars and the supporting elements are encased with a rubber layer during a vulcanisation process.

In the operation of the joint body, owing to cardanic stresses or bending stresses, tears can occur at the surface of or in the rubber-elastic casing in the region of an encircling outer edge of the L-shaped collars.

On the mounting of the joint bodies with such collar elements in a drive train of a motor vehicle, the torque required for the screwing-on can, furthermore, be trans-mitted to the collars, with the result that these collars are rotated relative to the attached rubber mass. As a result, tears can likewise occur at the surface of the rubber-elastic casing due to its attachment to the collars. Such tears in the rubber-elastic casing which may arise in the operation or even during the mounting have an adverse effect on service life of the joint body.

Besides the above-described collar elements, ring plates which are riveted to the bushings are also known from the prior art for the axial support of the loop bundles of an elastic joint body from the prior art. With these ring plates, it can happen that during the production process or the vulcanisation process the rubber flows onto the ring plates and adheres thereto. A time-consuming and costly cleaning operation therefore has to be included in the production process in order to clean the ring plates again.

Furthermore, in the development of such joint bodies, efforts are also being directed towards designing the joint bodies with regard to the increasing mechanical loads due to the continually rising engine outputs and towards further increasing their service life.

SUMMARY

It is thus the object of the present invention to provide an elastic joint body of the type described at the outset which, for the same dimensioning, meets the higher torque transmission demands and at the same time enables an increase of the service life, as well as simplifying the production process.

This object is achieved by an elastic joint body of the type described at the outset, in which a flange is provided at least one end region of at least one of the bushings for the axial support of an adjacent loop bundle, said flange encircling the bushing, being at least partially embedded in the rubber-elastic casing and having a U-shaped cross-section, as viewed in the axis-containing section, the cross-section being designed with two U longitudinal limbs and one U transverse limb, the flange bearing with a U longitudinal limb against the bushing.

The use of a U-shaped flange in the elastic joint body according to the invention makes it possible to avoid tears which may form at the surface of the rubber-elastic casing or in the rubber-elastic casing, starting from the outer edge of the L-shaped collars, and adversely affect the service life of the joint body. The tearing in the rubber-elastic casing can be avoided by a sectional attachment of the rubber to the U-shaped flange components. In other words, the rubber-elastic casing is preferably attached only to the U transverse limb of the U-shaped flange components, with the result that tears arising owing to cardanic stresses and during mounting can be avoided. Furthermore, through the elimination of cleaning operations and fastening operations, such as, for example, riveting of the ring plates, the production process is considerably shortened and less costly owing to the U-shaped flange components.

A further advantage of a use of U-shaped flange components over conventional axial supports of loop bundles is that the flange component is further stiffened by the additional U longitudinal limb. This means that when the flange components are loaded in the operation of the joint disc, in particular by the action of the loop bundles subjected to tensile loading, owing to the increased mechanical strength of the U-shaped flange components, their service life and hence the overall service life of the joint body is improved.

A development of the invention provides that the U-shaped cross-section of the flange opens outwards in the axial direction.

To avoid accumulations of dirt and for better removal of moisture in the region of the bushings or of the U-shaped flange, a development of the invention provides that the U longitudinal limb facing away from the bushing is inclined at a predetermined angle with respect to the axis of the bushing. In this context, provision may be made for the angle to be chosen in a range from 2 to 20°, preferably from 5-15°. In other words, as a result of the inclination of the U longitudinal limb facing away from the bushing, dirt and moisture can be quickly and simply removed from the bushings or U-shaped flange components owing to the centrifugal forces which act in the operation of the joint body. A further advantage of the sloping design of the U longitudinal limb facing away from the bushing is that individual loops or a plurality of loops of a loop bundle are prevented from slipping off over the flange during production of the joint body by the sloping course. If a U-shaped flange component of corresponding sloping design is used, individual loops of a loop bundle are prevented from slipping off over the flange owing to the slope, because they cannot slide up the slope against their tension.

According to a preferred embodiment of the invention, the flange is designed as a separate component and is pressed or latched onto the bushing. Latching-on is recommended in particular when using U-shaped flange components made of plastic which are latched onto a corresponding bushing. This is already known from the prior art for L-shaped collared bushings.

To simplify the production process, a development of the invention provides that the U longitudinal limb bearing against the bushing is designed shorter in the axial direction than the U longitudinal limb facing away from the bushing.

During the vulcanisation process, the mould can press on the radially outer longer limb and press it in elastically in the axial direction. As a result, the surfaces of the mould and U-shaped flange component bearing against one another form a sealing contact, so that no rubber can flow in the direction of the bushing. Moreover, the rubber can be pressed onto the outer, longer U longitudinal limb during the vulcanisation. In other words, the rubber does not run onto these elements, as with conventional ring plates or similar elements for the axial support of the loop bundles. According to the invention, this undesired excess rubber no longer has to be removed as in the prior art by costly and time-consuming cleaning operations, since no rubber runs over the outer, longer U longitudinal limb into the U shape of the flange in the joint body according to the invention with a U-shaped flange. Furthermore, the vulcanisation tool used can be simplified as a result of the outer, longer U longitudinal limb, since the U longitudinal limb can be utilised for pre-centring.

In addition to the above-described design of the flange as a separate component which is pressed onto the bushings, according to a preferred embodiment of the invention the flange can be integrally formed on at one end of the bushing, the end region of the bushing forming a U longitudinal limb which is integrally connected to a U transverse limb, which in turn is integrally connected to a U longitudinal limb facing away from the bushing. In this context, it remains to be mentioned that a flange can be fitted as a separate component on the other end section of the bushing. In other words, a bushing which is provided with an integrally formed flange at its one end region can be provided at its other axial end region with a separate flange component which is pressed onto this end region. The bushings with integrally formed flange components are alternately fitted with the separate flange components at the two axial surfaces of the rubber-elastic casing. As a result of the bushings with integral flange components, the production process can be further shortened, since the pressing-on operation for the flange at one end region of a bushing is eliminated.

It has already been described above that during the vulcanisation process the rubber is pressed onto the outer, longer U longitudinal limb. Therefore, a development of the invention provides that the rubber-elastic casing surrounds the flange in the region of its U longitudinal limb facing away from the bushing as far as the axially outer edge of this limb, an axially outer circumferential surface of the U longitudinal limb facing away from the bushing terminating substantially flush with the surface of the elastic casing. As a result of this flush termination or the pressing of the flange into the rubber-elastic casing during the vulcanisation, according to one embodiment of the invention the flange forms a yielding seal with the rubber-elastic casing, since the U-shaped flange displaces the fluid rubber during the vulcanisation and the flange so to speak "sinks in".

For the further axial support or axial guidance of the loop bundles running around a bushing, a development of the invention provides that, between two flange components arranged in each case at the end sections of a bushing, collars or insert discs for the axial support of individual loop bundles located therebetween are provided. These additional insert discs and collars prevent undesired friction effects between the loop bundles and axially support these bundles precisely in the particularly highly stressed region around the bushings, with the result that the service life and the torque absorption can be further increased.

Since the rubber does not have to be attached to the U longitudinal limb facing away from the bushing, according to the invention a transverse web can be provided on the U longitudinal limb facing away from the bushing to avoid tears in the rubber-elastic casing. With this additional transverse web on the U longitudinal limb facing away from the bushing, i.e. on the outer circumference of the U-shaped flange, the risk of a wide opening of the unattached rubber-elastic material can be further reduced or completely prevented, with the result that penetration of dirt and moisture into the joint body is prevented.

According to a further embodiment of the invention, the U longitudinal limb facing away from the bushing can be surrounded by the rubber-elastic casing. In other words, the U-shaped flange has rubber at least partially injected around it. The rubber-elastic material surrounding the U longitudinal limb facing away from the bushing is not attached to the flange component and can therefore move depending on the loading state of the joint body, without the risk of tearing. On transition to the rest state of the joint body, the rubber-elastic material moves back to the starting position again. Furthermore, here the rubber-elastic material surrounding the U longitudinal limb facing away from the bushing prevents the penetration of dirt and water into the joint body.

As regards the material choice for the flange components, according to a preferred embodiment these components are made of metal or plastic.

A development of the invention provides that the rubber-elastic casing is at least sectionally attached to the flange. As a result of the sectional attachment of the flange components to the rubber-elastic casing, the support of the loop bundles can be influenced and advantageously brought to bear for the avoidance of tears.

The invention further relates to a shaft arrangement having a joint body according to the invention.

BRIEF DESCRIPTION OF THE DRAWINGS

The invention is explained below by way of example with the aid of the accompanying figures, in which:

FIGS. 2a, 2b, 2c, 2d, 2e show cross-sectional views of a flange with different angles of inclination of the U longitudinal limb facing away from the bushing;

DETAILED DESCRIPTION

Figure 1:
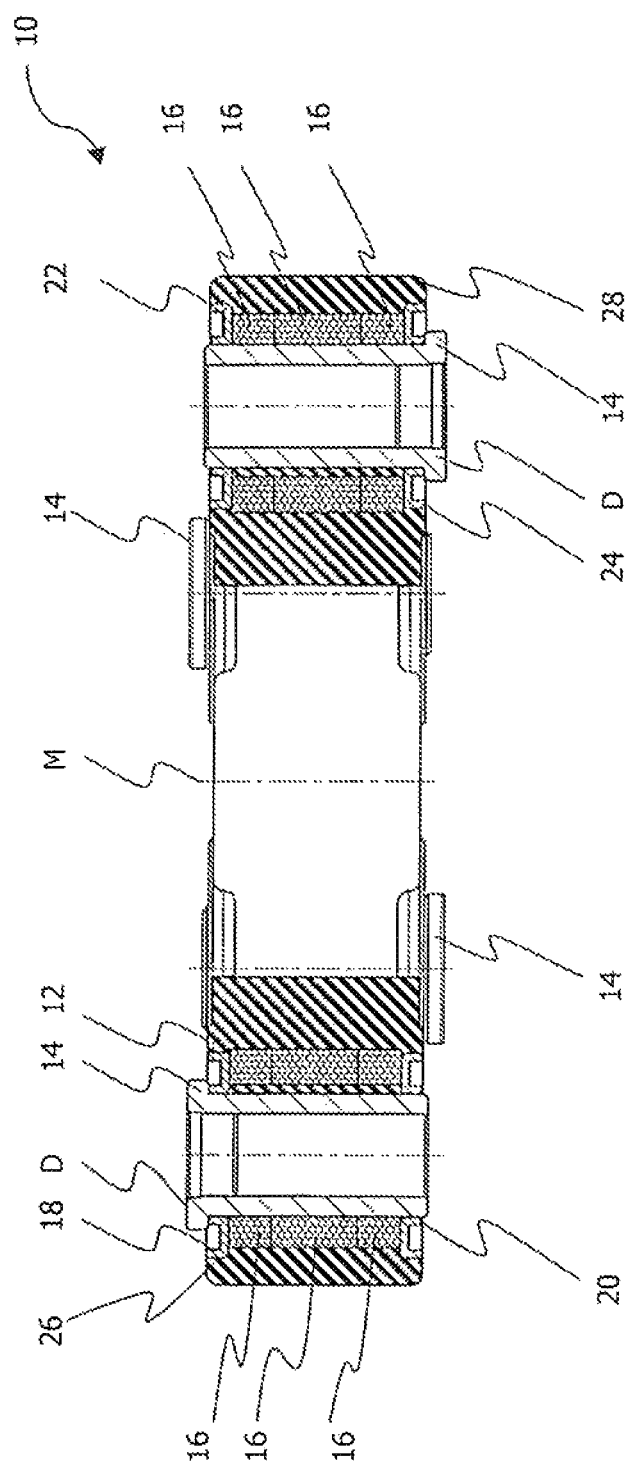
FIG. 1 shows an axis-containing sectional view of a first embodiment of the invention.

FIG. 1 shows a sectional view of a first embodiment of an elastic joint body 10 with bushings 14 surrounded by a rubber-elastic casing 12. At the end regions of the bushings 14 can be seen the flange components 18, 20, 22 and 24 arranged for the axial support of the loop bundles 16. The U-shaped flange components 18, 20, 22 and 24 are arranged in such a manner that their U-shaped cross-section opens outwards in the axial direction of the bushings 14.

The geometry of the flange components 18, 20, 22 and 24 is discussed in detail with reference to FIGS. 2a, 2b, 2c, 2d and 2e.

From FIG. 1 it can further be seen that the U-shaped flange components 18, 20, 22 and 24 or the U longitudinal limb facing away from the bushing 14 terminates substantially flush with the surfaces 26 and 28 of the rubber-elastic casing 12, i.e. the U-shaped flange components are embedded in the rubber-elastic casing. As a result of the U-shaped flange components 18, 20, 22 and 24, tears in the rubber-elastic casing 12 owing to cardanic stresses or to torques transmitted to the bushings 14 during the mounting are avoided, since in contrast to the prior art the flange components 18, 20, 22 and 24 are not completely attached to the rubber-elastic casing 12 or completely encased. To avoid tearing, the rubber-elastic casing 12 is preferably attached only to the U transverse limb of the U-shaped flange components 18, 20, 22 and 24, whereas the U longitudinal limb facing away from the bushing 14 not attached to the rubber-elastic casing and the in the prior art from an outer edge of the collars or similar elements can be avoided.

As a result of the avoidance of tears in the rubber-elastic casing 12, the flange components 18, 20, 22 and 24 can have a smaller height in the axial direction compared with the prior art. The reduction of the height in the axial direction of the flange components 18, 20, 22 and 24 makes it possible for the individual loop bundles 16 to be designed with an enlarged cross-section in the axial direction. Loop bundles with an enlarged cross-section mean more cord windings in the individual loop bundles 16, with the result that the capacity for torque absorption and at the same time the service life is accordingly increased. As an alternative to this, for the same torque absorption, the elastic joint body 10 can be reduced in size in the axial direction, i.e. space within a shaft arrangement, such as, for example, a drive train of a vehicle, can be saved.

As a result of the U shape of the flange components 18, 20, 22 and 24, it is also possible for the production process of the elastic joint body 10 to be simplified and optimised in terms of cost. In the production process or the vulcanisation process, the rubber-elastic casing is pressed onto the, in cross-section, outer U longitudinal limb, i.e. no excess rubber gets into the U shape of the flange components 18, 20, 22 and 24. The U-shaped flange components 18, 20, 22 and 24 thus no longer have to be cleaned, which results in a considerable simplification and speeding-up of the production process. A concomitant of this is that the amount of rubber required in the production is reduced, since the rubber waste which arises in the prior art is eliminated.

From FIG. 1 it can further be seen that the bushings 14 have alternately, depending on their connection to shafts (not shown) of a shaft arrangement or their connection to the drive shaft or driven shaft, at their end a section D of enlarged cross-section in the axial direction in front of the U-shaped flange components. This section D serves to prevent a torque which may be transmitted to the bushing during the screwing-on of the elastic joint body 10 from being transmitted to the flange components, in this case 18 and 24, and also to support the U-shaped flange components 16 and 24 additionally in the axial direction.

FIG. 2a shows a first exemplary embodiment of a U-shaped flange 18, with inner and outer U longitudinal limbs 30 and 32 and U transverse limbs 34 extending between these limbs. The flange 18 is rotationally symmetrical about its centre axis A. From FIG. 2a it can further be seen that the inner U longitudinal limb 30 is of slightly shortened design compared with the outer U longitudinal limb 32. The longer design of the outer U longitudinal limb 32 enables the vulcanising tool used in the production process to press on the longer U longitudinal limb 32 and slightly elastically deform this limb, so that a sealing contact is obtained. It is thus possible to prevent the rubber from flowing to the bushing in the vulcanisation process. Furthermore, a pre-centring in the tool can take place can as a result of this U longitudinal limb 32. The flange 18 forms with the rubber-elastic casing a yielding seal, i.e. during the vulcanisation process no rubber flows between the flange components 18, 20, 22, 24 or the rubber is displaced by these flange components (FIG. 1). The loop bundles 16 are thus directly supported by the flange components 18, 20, 22, 24.

FIG. 2b shows a further exemplary embodiment of a U-shaped flange 18, in which the outer U longitudinal limb 32 is not only of longer design in the axial direction, but is also at an angle of 5° with respect to the axis A of the U-shaped flange 18.

FIG. 2c likewise shows the U-shaped flange 18, in which the angle of inclination of the outer U longitudinal limb 32 with respect to the axis A of the U-shaped flange is 15°. The angle of inclination can generally be chosen in a range from 2 to 20°, preferably in a range from 5 to 15°. The sloping limb 32 of the U-shaped flange has the advantage of improved dirt removal owing to centrifugal forces which act in operation. Moreover, it prevents undesired slipping-off of individual cords of a loop bundle, because these cords cannot slide up the slope owing to their tension.

FIG. 2d shows a sectional partial view of a further embodiment of a U-shaped flange according to the invention. This embodiment is of similar design to the embodiment according to FIG. 2d, but made of plastic. It can be latched, via a latching nose 35 arranged on the radially inner surface of the limb 30, onto a bushing designed with a corresponding recess, as is known per se from the prior art.

In the exemplary embodiments of the flange 18 according to FIGS. 2b and 2c, as a result of the inclination of the outer U longitudinal limb 32, dirt and moisture can be quickly removed from the region of the bushings or the U-shaped flange 18 owing to the centrifugal forces which act in the operation of a shaft arrangement, such as, for example, the drive train of a vehicle. The adverse effect of dirt or moisture on the service life can thus be prevented as far as possible.

FIG. 2e likewise shows the U-shaped flange 18, in which there is provided on the U longitudinal limb 32 facing away from the bushing 14 a further transverse web 37 which extends from this limb 32. Since the rubber-elastic casing 12 does not have to be attached to the longitudinal limb 32, that is to say when not attached it can move away from this limb 32 in operation, a very wide opening of the rubber-elastic casing in the region around the U-shaped longitudinal limb 37 can be reduced or completely prevented by the transverse web 37.

Further exemplary embodiments of the invention are explained below with reference to the further figures. To avoid repetition and to simplify the description, for components which act in the same way or are of the same type, the same reference symbols are used as in the first exemplary embodiment, but prefixed with a consecutive number.

Figure 3:
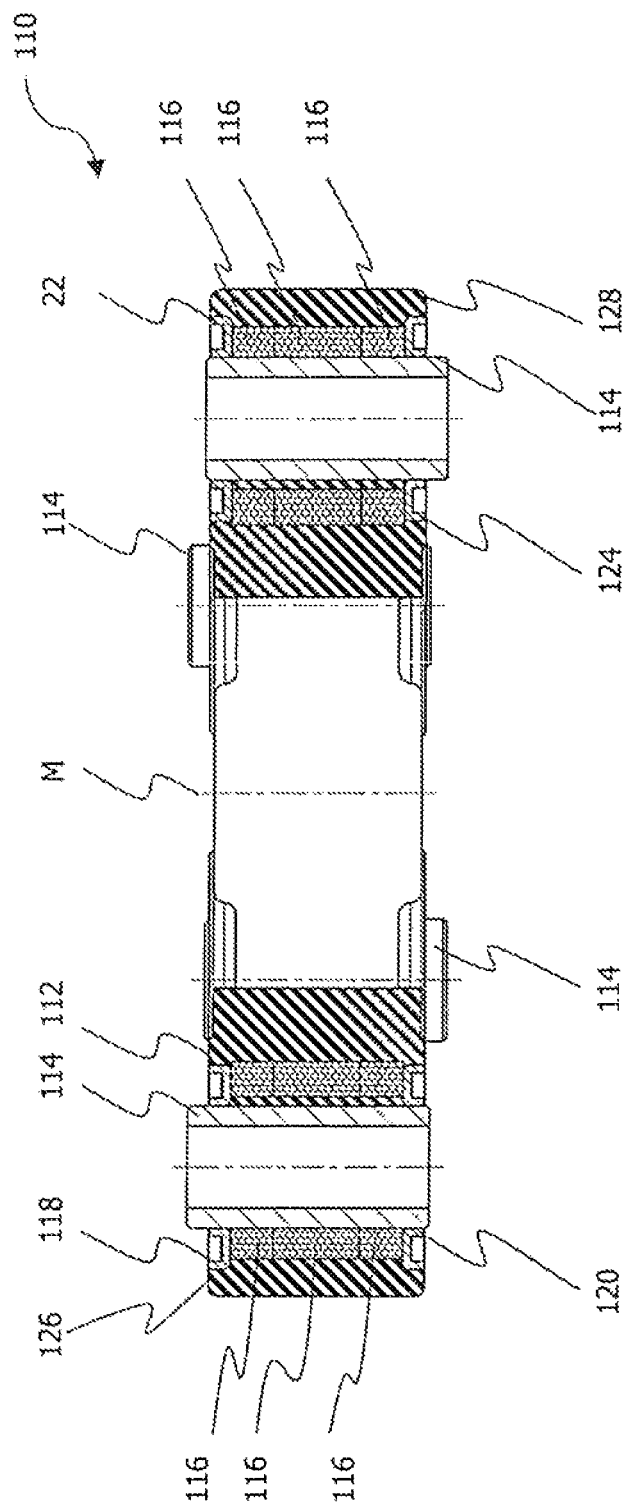
FIG. 3 shows an axis-containing sectional view of a second embodiment of the invention.

FIG. 3 shows a sectional view of a second embodiment of the invention, which differs from the first embodiment according to FIG. 1 merely in that the bushings 114 do not alternately have a thickened end section D and the flange components 118, 120, 122 and 124 are pressed directly onto the bushings.

Figure 4:
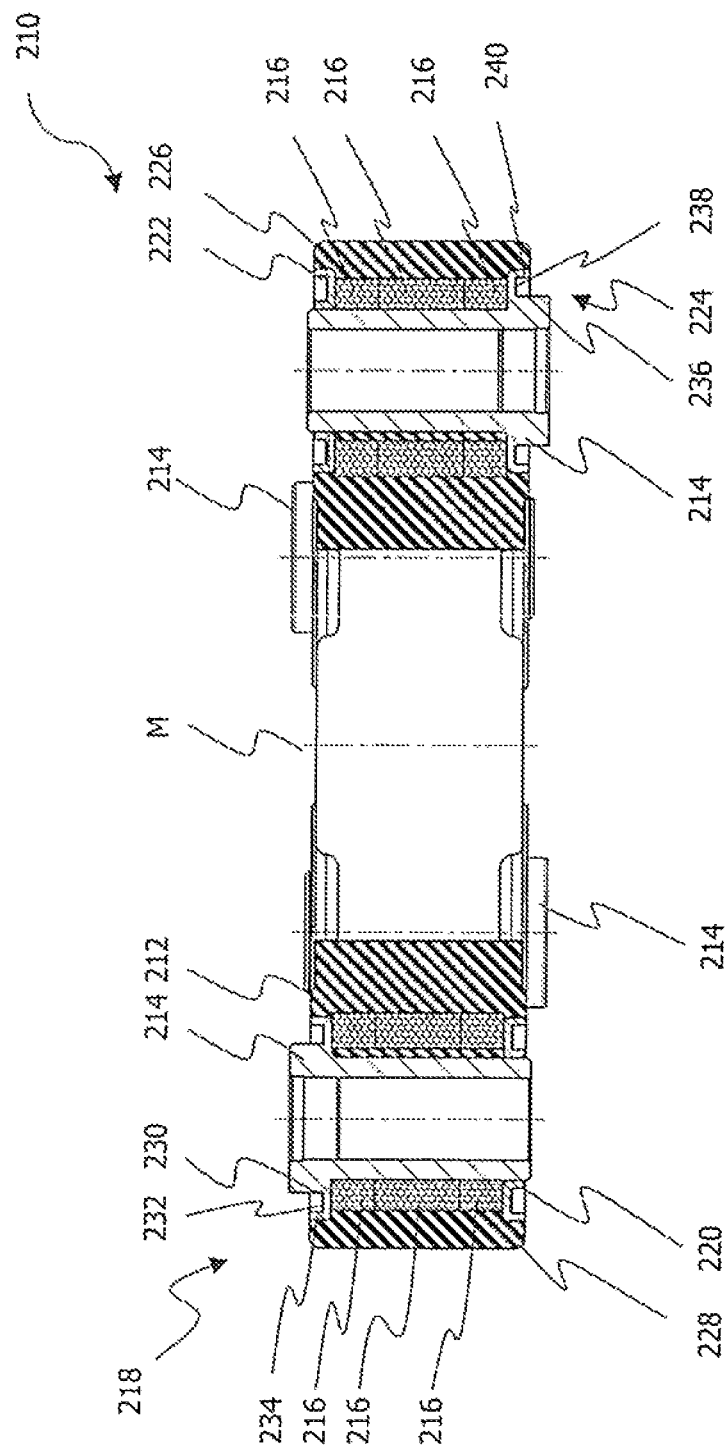
FIG. 4 shows an axis-containing sectional view of a third embodiment of the invention.

FIG. 4 shows an axis-containing sectional view of a third embodiment of the invention, in which at an axial end of the bushings 214 a flange 218 and 224, respectively, is integrally formed on the bushings 214, a U longitudinal limb 230 being formed by the end region of the bushing 214. The U longitudinal limb 230 is integrally connected to the U transverse limb 234, which in turn is integrally connected to a U longitudinal limb 232 facing away from the bushing. The same applies to the flange 224 with the U longitudinal limb 236 which is formed by the bushing and is integrally connected to the U longitudinal limb 238. The U transverse limb 238 is in turn integrally connected to the U longitudinal limb 240.

From FIG. 4 it can further be seen that a separate flange 220 is pressed onto the axial end of the bushing 214 facing way from the flange integrally formed on the bushing, and the same applies to the flange 222. By arranging bushings 214 with integral flange components 218 and 224, the production process can be speeded up, since the pressing-on operation for one of the flange components at one end region of a bushing is eliminated.

Figure 5:
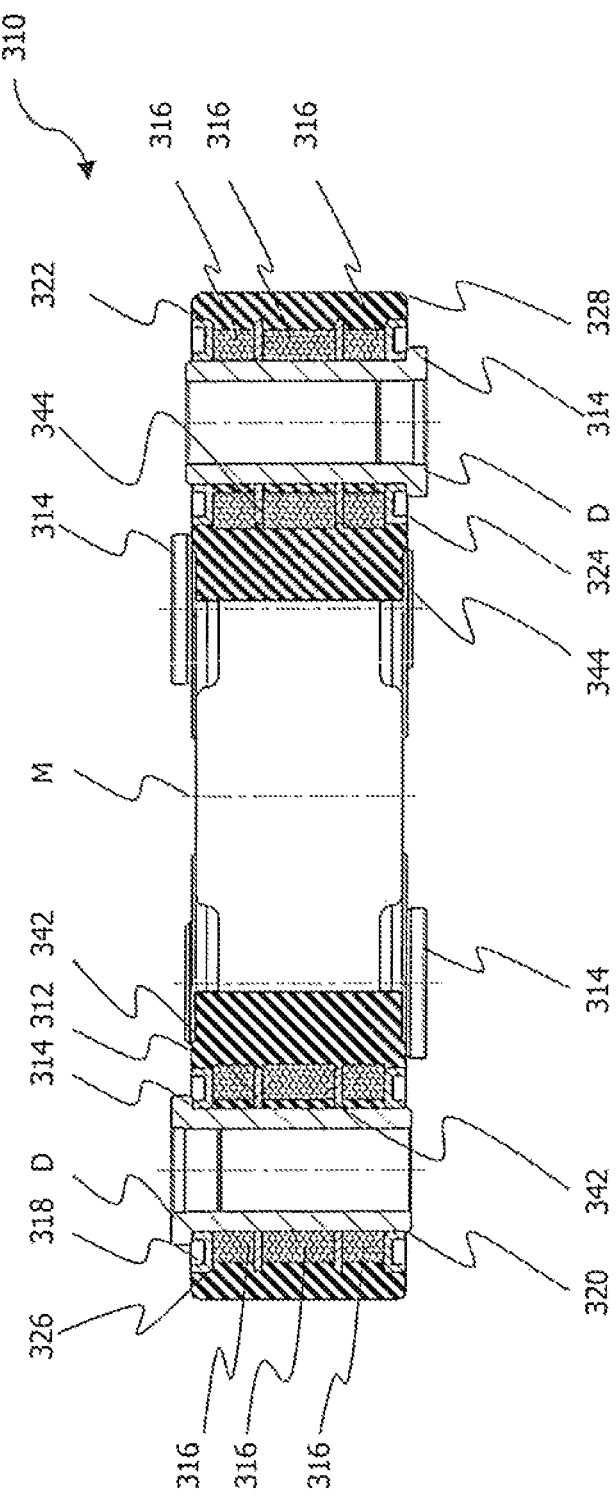
FIG. 5 shows an axis-containing sectional view of a fourth embodiment of the invention.

FIG. 5 shows a fourth embodiment of the invention, which differs from the first embodiment of the invention according to claim 1 merely in that between the individual loop bundles 316 insert discs 342 and 344, respectively, are arranged. The insert discs 342 and 344 serve for the additional axial support of the individual loop bundles. The insert discs 342 and 344 are arranged for the further axial support or guidance of the loop bundles 316 in the region around the bushings 314 which is highly loaded by the cardanic stresses. In addition, the friction of the individual loop bundles 316 among one another can be avoided by the insert discs 342 and 344, i.e. the friction effects of identical material pairings on one another which may adversely affect the service life of the joint body 310.

Figure 6:
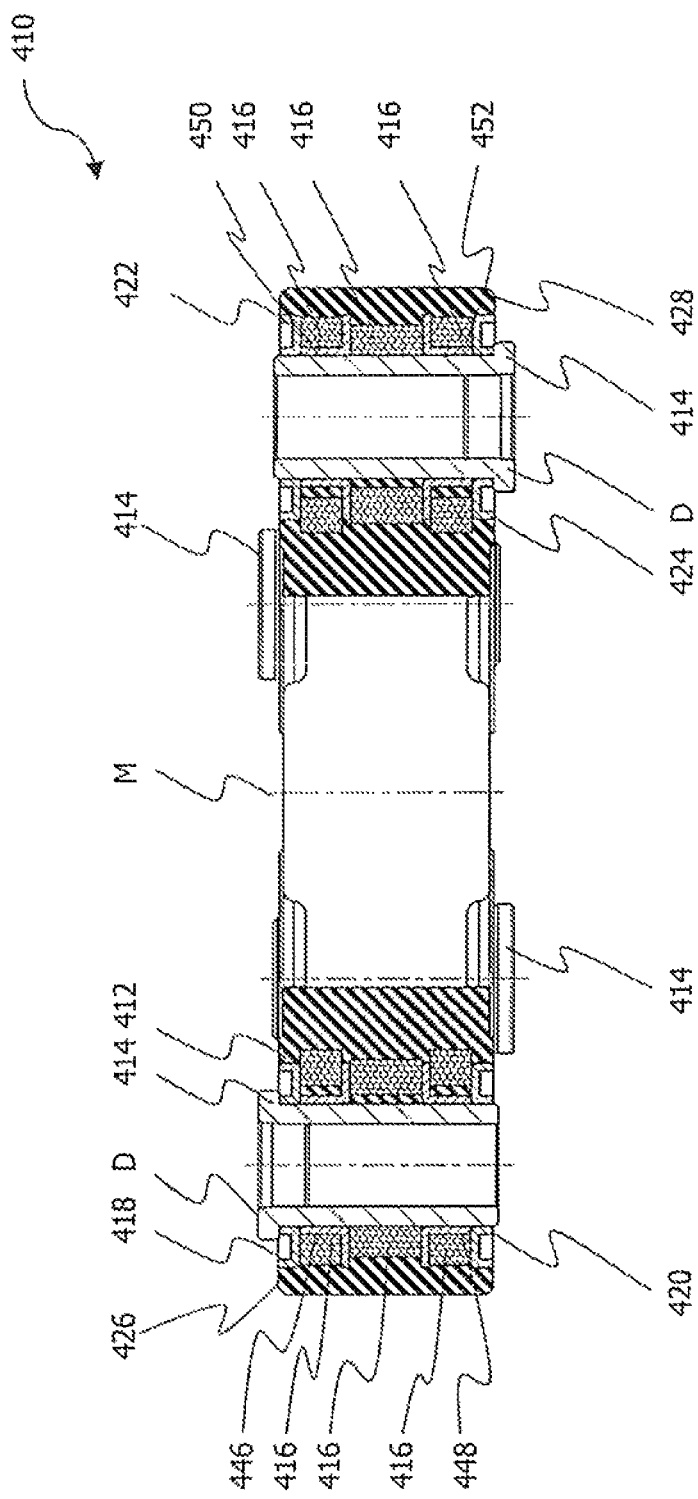
FIG. 6 shows an axis-containing sectional view of a fifth embodiment of the invention.

FIG. 6 shows a fifth embodiment of the invention, in which L-shaped collar elements 446, 448, 450 and 452 are arranged for the further axial support of the loop bundles. The L-shaped collar elements 446, 448, 450 and 452 are arranged, with their section bearing against the bushings 414, in the direction of the flange components 418, 420, 422 and 424 or in the direction of the end sections of the bushings 414. With their section bearing against the bushings, the collars 446, 448, 450, 452 are supported on the flange components 418, 420, 422 and 424 and thus form with the flange bodies or between them guide paths for the axial guidance and support of the loop bundles 416.

The same applies to the embodiment according to FIG. 6 as was stated with reference to FIG. 5 that the collars 446, 448, 450, 452 are arranged for axial support and the avoidance of friction effects between the individual loop bundles 416.

Figure 7:
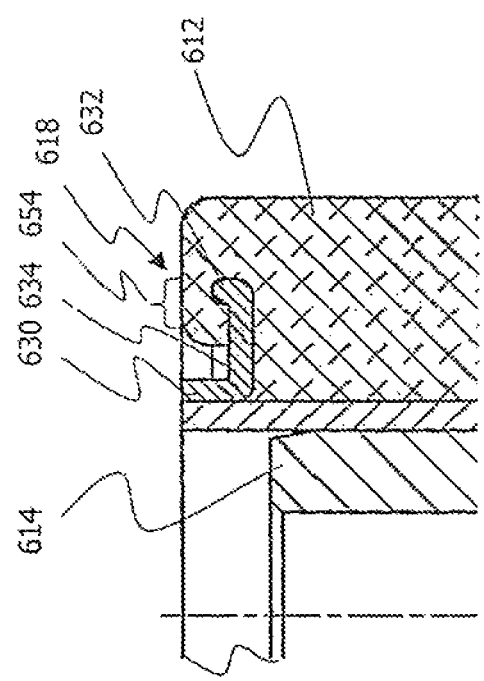
FIG. 7 shows a broken-open sectional view of a sixth embodiment of the invention.

FIG. 7 shows a sixth embodiment of the invention, in which the U-shaped flange 618 is partially surrounded in an inner region 654 by the rubber-elastic casing 612. As can be seen from FIG. 7, the U longitudinal limb 632 facing away from the bushing 614 is, according to this embodiment of the invention, of shortened design compared with the longitudinal limb 630 bearing against the bushing 614. Accordingly, the longitudinal limb 632 is completely surrounded by the rubber-elastic casing 612. The rubber-elastic material in the region 654 does not have to be attached to the U-shaped flange 618 or to the U longitudinal limb 632 and, when it is not attached, can move in the loaded state without tears occurring in the rubber-elastic casing 612. In the unloaded state, i.e. in the rest state of the joint body 610, the rubber-elastic material 612 in the region 654 moves back to its starting position again. The longitudinal limb 632 in this embodiment of the invention cooperates with the rubber-elastic material 612 in the region 654 as a seal against the penetration of dirt and water. Apart from the above-described possibility for sealing at the outer U longitudinal limb during production, all the advantages of the above-described embodiment can be achieved in this embodiment.

The invention claimed is:

1. Elastic joint body for a shaft arrangement for the articulated connection of two shaft sections, comprising:
    a plurality of bushings which are arranged in the circumferential direction at predetermined angular distances with respect to a centre axis (M) of the joint body,
    a plurality of loop bundles, each loop bundle looping around in each case two adjacent bushings, and
    a rubber-elastic casing in which the loop bundles and the bushings are at least partially embedded, wherein
a flange is provided at at least one end region of at least one of the bushings for the axial support of an adjacent loop bundle, said flange encircling the bushing, being at least partially embedded in the rubber-elastic casing and having a U-shaped cross-section, as viewed in the axis-containing section, the cross-section being designed with two U longitudinal limbs and one U transverse limb, the flange bearing with a U longitudinal limb against the bushing.

2. Joint body according to claim 1, wherein the U-shaped cross-section of the flange opens outwards in the axial direction.

3. Joint body according to claim 1, wherein the U longitudinal limb facing away from the bushing is inclined at a predetermined angle with respect to a central axis of the flange.

4. Joint body according to claim 3, wherein the angle is in a range from 2 to 20°.

5. Joint body according to claim 1 wherein the flange is designed as a separate component and is pressed or latched onto the bushing.

6. Joint body according to claim 5, wherein the U longitudinal limb bearing against the bushing is designed shorter in the axial direction than the U longitudinal limb facing away from the bushing.

7. Joint body according to claim 1, wherein a flange is integrally formed on at one end of the bushing, the end region of the bushing forming a U longitudinal limb which is integrally connected to a U transverse limb, which in turn is integrally connected to a U longitudinal limb facing away from the bushing.

8. Joint body according to claim 7, wherein a flange is fitted as a separate component on the other end section of the bushing.

9. Joint body according to claim 1 wherein the rubber-elastic casing surrounds the flange in the region of its U longitudinal limb facing away from the bushing as far as the axially outer edge of this limb, an axially outer circumferential surface of the U longitudinal limb facing away from the bushing terminating substantially flush with the surface of the elastic casing.

10. Joint body according to claim 1, wherein the flange forms a yielding seal with the rubber-elastic casing.

11. Joint body according to claim 1 wherein, between two flange components arranged in each case at the end sections of a bushing, collars or insert discs for the axial support of individual loop bundles located therebetween are provided.

12. Joint body according to claim 1, wherein a transverse web is provided on the U longitudinal limb facing away from the bushing.

13. Joint body according to claim 1, wherein the U longitudinal limb facing away from the bushing is surrounded by the rubber-elastic casing.

14. Joint body according to claim 1, wherein the flange is made of metal or plastic.

15. Joint body according to claim 1, wherein the rubber-elastic casing is at least sectionally attached to the flange.

16. Shaft arrangement having a joint body, the joint body comprising:
- a plurality of bushings which are arranged in the circumferential direction at predetermined angular distances with respect to a centre axis (M) of the joint body,
- a plurality of loop bundles, each loop bundle looping around in each case two adjacent bushings, and
- a rubber-elastic casing in which the loop bundles and the bushings are at least partially embedded, wherein a flange is provided at at least one end region of at least one of the bushings for the axial support of an adjacent loop bundle, said flange encircling the bushing, being at least partially embedded in the rubber-elastic casing and having a U-shaped cross-section, as viewed in the axis-containing section, the cross-section being designed with two U longitudinal limbs and one U transverse limb, the flange bearing with a U longitudinal limb against the bushing.

* * * * *